US012580188B2

(12) United States Patent
Heo et al.

(10) Patent No.: US 12,580,188 B2
(45) Date of Patent: Mar. 17, 2026

(54) POSITIVE ELECTRODE MATERIAL POWDER, POSITIVE ELECTRODE AND LITHIUM SECONDARY BATTERY INCLUDING THE SAME

(71) Applicant: LG Energy Solution, Ltd., Seoul (KR)

(72) Inventors: Jong Wook Heo, Daejeon (KR); Wang Mo Jung, Daejeon (KR); Chi Ho Jo, Daejeon (KR); Jin Tae Hwang, Daejeon (KR); Hae Jung Jung, Daejeon (KR); Byung Joon Chae, Daejeon (KR); Tae Gu Yoo, Daejeon (KR); Suk Bae Yoon, Daejeon (KR); Hyeon Jin Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 561 days.

(21) Appl. No.: 18/151,079

(22) Filed: Jan. 6, 2023

(65) Prior Publication Data

US 2023/0223526 A1     Jul. 13, 2023

(30) Foreign Application Priority Data

Jan. 7, 2022     (KR) ........................ 10-2022-0002994

(51) Int. Cl.
H01M 10/0525          (2010.01)
H01M 4/04          (2006.01)
(Continued)

(52) U.S. Cl.
CPC ......... H01M 4/485 (2013.01); H01M 4/0404 (2013.01); H01M 4/505 (2013.01);
(Continued)

(58) Field of Classification Search
CPC ............. H01M 10/0525; H01M 4/485; H01M 4/505; H01M 4/525
See application file for complete search history.

(56) References Cited

U.S. PATENT DOCUMENTS 10,637,056 B2     4/2020 Lee et al.
11,121,357 B2     9/2021 Baek et al.
(Continued)

FOREIGN PATENT DOCUMENTS

CN          111384371 A      7/2020
EP           4064391 A1      9/2022
(Continued)

OTHER PUBLICATIONS

Yoo, G. et al., "Effects of Calcinations Temperature on the Electrochemical Properties of Li[Ni0.6Co0.2Mn0.2]O2 Lithium-ion Cathode Materials" Journal of the Korean Electrochemical Society, Feb. 2013, pp. 59-64, vol. 16, No. 2. English Translation of Abstract.
(Continued)

*Primary Examiner* — Kevin E Yoon
(74) *Attorney, Agent, or Firm* — Lerner David LLP

(57)          ABSTRACT

A positive electrode material powder including a lithium nickel-based oxide represented by Chemical Formula 1 ($Li_aNi_bCo_cM^1_dM^2_eO_2$) and having a degree of single-particle formation, represented by the following Equation (1), of 0.3 to 0.8:

$$\frac{\sum_{i=1}^{n}\frac{4\pi}{3}R_i^3}{n} \times \frac{1}{D_{50}}.$$

In Equation (1), $R_i$ is a radius of the $i^{th}$ grain as measured by subjecting an electrode manufactured using the positive electrode material powder to ion milling and then analyzing the cross section of the electrode by electron backscatter diffraction (EBSD), n is the total number of grains as measured by the EBSD analysis and ranges from 350 to 450, and $D_{50}$ is a volume-cumulative average particle diameter of
(Continued)

20um the positive electrode material powder as measured using a laser diffraction particle size analyzer.

12 Claims, 7 Drawing Sheets

(51) Int. Cl.

| | |
|---|---|
| *H01M 4/485* | (2010.01) |
| *H01M 4/505* | (2010.01) |
| *H01M 4/525* | (2010.01) |
| H01M 4/02 | (2006.01) |

(52) U.S. Cl.
CPC ....... *H01M 4/525* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2005/0158546 | A1 | 7/2005 | Shizuka |
| 2008/0182169 | A1 | 7/2008 | Shizuka |
| 2015/0372301 | A1 | 12/2015 | Kim et al. |
| 2019/0036119 | A1 | 1/2019 | Lee et al. |
| 2020/0106098 | A1 | 4/2020 | Kobayashi |
| 2020/0185714 | A1 | 6/2020 | Han et al. |
| 2020/0287212 | A1 | 9/2020 | Kobayashi et al. |
| 2020/0295368 | A1 | 9/2020 | Kong et al. |
| 2021/0135187 | A1 | 5/2021 | Park et al. |
| 2021/0273121 | A1 | 9/2021 | Yoneda et al. |
| 2022/0045324 | A1 | 2/2022 | Du et al. |
| 2022/0102716 | A1 | 3/2022 | Kobayashi et al. |
| 2022/0112095 | A1 | 4/2022 | Kobayashi |
| 2022/0246925 | A1 | 8/2022 | Lho et al. |
| 2023/0123331 | A1 | 4/2023 | Watanabe et al. |

FOREIGN PATENT DOCUMENTS

| | | | | |
|---|---|---|---|---|
| JP | 2003034538 | A | 2/2003 | |
| JP | 4656349 | B2 | 3/2011 | |
| JP | 2017188443 | A | 10/2017 | |
| JP | 2017188444 | A | 10/2017 | |
| JP | 2019508869 | A | 3/2019 | |
| JP | 2021064598 | A | 4/2021 | |
| JP | 2021516424 | A | 7/2021 | |
| JP | 2021141112 | A | 9/2021 | |
| JP | 2021163542 | A | 10/2021 | |
| KR | 20110104083 | A | 9/2011 | |
| KR | 20150145471 | A | 12/2015 | |
| KR | 1020190051863 | A * | 5/2019 | ........... H01M 4/505 |
| KR | 20200106188 | A | 9/2020 | |
| KR | 20210028840 | A | 3/2021 | |
| KR | 20210097646 | A | 8/2021 | |
| KR | 20190002532 | A | 11/2021 | |
| WO | 2018186538 | A1 | 10/2018 | |
| WO | WO-2019221497 | A1 * | 11/2019 | ........... C01G 53/82 |
| WO | 2021025464 | A1 | 2/2021 | |
| WO | 2021153350 | A1 | 8/2021 | |

OTHER PUBLICATIONS

Supplementary European Search Report for Application No. 23737433.5 dated Mar. 3, 2025, pp. 2.

* cited by examiner

COMPARATIVE EXAMPLE 1    COMPARATIVE EXAMPLE 2      EXAMPLE 1

20um

20um

20um

POSITIVE ELECTRODE MATERIAL POWDER, POSITIVE ELECTRODE AND LITHIUM SECONDARY BATTERY INCLUDING THE SAME

CROSS-REFERENCE TO RELATED APPLICATION

This application claims priority to and the benefit of Korean Patent Application No. 10-2022-0002994, filed on Jan. 7, 2022, the disclosure of which is incorporated herein by reference in its entirety.

BACKGROUND

1. Field of the Invention

The present technology relates to a positive electrode material powder for a lithium secondary battery, and a positive electrode and lithium secondary battery including the same. More specifically, the present invention relates to a positive electrode material powder for a lithium secondary battery, which is capable of minimizing an increase in resistance and improving high-temperature performance, and a positive electrode and lithium secondary battery including the same.

2. Discussion of Related Art

Lithium secondary batteries generally consist of a positive electrode, a negative electrode, a separator, and an electrolyte, and the positive electrode and the negative electrode include active materials that enable the intercalation and deintercalation of lithium ions.

As the positive electrode active material of the lithium secondary battery, lithium cobalt oxides ($LiCoO_2$), lithium nickel oxides ($LiNiO_2$), lithium manganese oxides ($LiMnO_2$, $LiMnO_4$, etc.), lithium iron phosphate compounds ($LiFePO_4$), and the like have been used. Among those listed above, the lithium cobalt oxide has high operating voltage and excellent capacity characteristics, but it is difficult to commercially apply the lithium cobalt oxide to large-capacity batteries because cobalt, which is a raw material of the lithium cobalt oxide, is expensive and unstably supplied. The lithium nickel oxide has poor structural stability, and thus it is difficult to implement sufficient lifetime characteristics. Meanwhile, the lithium manganese oxide has excellent stability, but capacity characteristics are poor. Accordingly, lithium composite transition metal oxides including at least two types of transition metals have been developed to compensate for the disadvantages of lithium transition metal oxides including Ni, Co, or Mn alone, and particularly, lithium nickel cobalt manganese oxides including Ni, Co, and Mn have been widely used in the field of batteries for electric vehicles.

Conventional lithium nickel cobalt manganese oxides are generally in the form of a spherical secondary particle in which several tens to several hundreds of primary particles are agglomerated. However, when the lithium nickel cobalt manganese oxides in the form of a secondary particle in which many primary particles are agglomerated are used, the detachment of primary particles, that is, the breakage of particles, easily occurs in a rolling process in the manufacture of a positive electrode, and cracks are generated inside particles in a charging/discharging process. When the breakage or cracking of positive electrode active material particles occurs, a contact area with an electrolyte is increased to increase gas generation and deterioration of the active material, which are caused by a side reaction with an electrolyte, and accordingly, lifetime characteristics are degraded.

Meanwhile, recently, there is an increasing demand for high-output high-capacity batteries such as batteries for electric vehicles, and accordingly, a nickel content in the positive electrode active material is gradually increasing. When a nickel content in the positive electrode active material increases, initial capacity characteristics are improved, but a large amount of highly reactive $Ni^{+4}$ ions are produced as charging and discharging are repeated, and thus the structure of the positive electrode active material collapses. As a result, a deterioration rate of the positive electrode active material increases, and thus lifetime characteristics and battery stability are degraded, and particularly, performance rapidly deteriorates in exposure to a high temperature.

In order to solve the above problems, there has been proposed a technique of preparing a positive electrode active material in the form of a single particle—not a secondary particle—by increasing a firing temperature in the preparation of a lithium nickel cobalt manganese oxide. Since the positive electrode active material in the form of a single particle has a smaller contact area with an electrolyte than a conventional positive electrode active material in the form of a secondary particle, less side reactions with an electrolyte occur, and since the single particle has excellent particle strength, less breakage of particles occurs in the manufacture of an electrode. Therefore, when the positive electrode active material in the form of a single particle is used, there are advantages of reduced gas generation and excellent lifetime characteristics. However, a conventional positive electrode active material in the form of a single particle has high resistance, and thus it is not possible to obtain sufficient output performance when the single particle, conventional positive electrode active material is used.

SUMMARY OF THE INVENTION

The present invention has been made to solve the above problems and is directed to providing a positive electrode material powder for a lithium secondary battery, which exhibits low resistance characteristics while having reduced gas generation and excellent lifetime characteristics at a high temperature.

The present invention is also directed to providing a positive electrode and a lithium secondary battery whose resistance characteristics and high-temperature characteristics are excellent by including the above-described positive electrode material powder.

One aspect of the present invention provides a positive electrode material powder which includes positive electrode active material particles including a lithium nickel-based oxide represented by the following Chemical Formula 1 and has a degree of single-particle formation, represented by the following Equation (1), of 0.3 to 0.8:

$$Li_aNi_bCo_cM^1_dM^2_eO_2 \quad \text{[Chemical Formula 1]}$$

In Chemical Formula 1, $M^1$ is Mn, Al, or a combination thereof, $M^2$ is one or more selected from the group consisting of Ba, Ca, Zr, Ti, Mg, Ta, Nb, and Mo, and $0.80 \leq a \leq 1.20$, $0.55 \leq b < 1$, $0 < c < 0.45$, $0 < d < 0.45$, and $0 \leq e \leq 0.20$ are satisfied.

$$\text{Degree of single-particle formation} = \frac{\sum_{i=1}^{n} \frac{4\pi}{3} R_i^3}{n} \times \frac{1}{D_{50}} \qquad \text{Equation (1)}$$

3

In Equation (1), $R_i$ is a radius of the $i^{th}$ grain as measured by subjecting an electrode manufactured using the positive electrode material powder to ion milling and then analyzing the cross section of the electrode by electron backscatter diffraction (EBSD), n is the total number of grains as measured by the EBSD analysis and ranges from 350 to 450, and $D_{50}$ is a volume-cumulative average particle diameter of the positive electrode material powder as measured using a laser diffraction particle size analyzer.

The positive electrode active material particle may comprise, or be in the form of, a single particle consisting of one nodule and/or a pseudo-single particle which is a composite of 30 or less nodules. Preferably, the positive electrode material powder may consist of a combination of positive electrode active material particles in the form of a single particle and in the form of a pseudo-single particle.

The nodules of the positive electrode material powder may have an average particle diameter of 0.8 μm to 4.0 μm, and the positive electrode material powder may have a $D_{50}$ of 2.0 μm to 10.0 μm and an average grain diameter of 0.5 μm to 4.0 μm.

The positive electrode active material may further include a coating layer formed on the surface of the lithium nickel-based oxide and including one or more coating elements selected from the group consisting of Al, Ti, W, B, F, P, Mg, Ni, Co, Fe, Cr, V, Cu, Ca, Zn, Zr, Nb, Mo, Sr, Sb, Bi, Si, and S.

Another aspect of the present invention provides a positive electrode including the above-described positive electrode material powder and a lithium secondary battery including the positive electrode.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

4

DETAILED DESCRIPTION OF EXEMPLARY EMBODIMENTS

Figure 1:
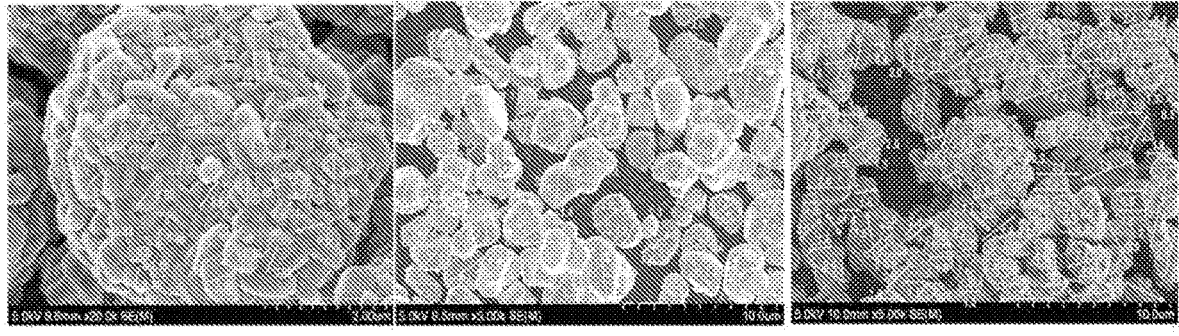
FIG. 1 shows scanning electron microscope (SEM) images of positive electrode material powders prepared in Example 1 of the present invention and Comparative Examples 1 and 2.

Hereinafter, the present invention will be described in further detail.

Terms and words used in this specification and the claims should not be interpreted as being limited to commonly used meanings or meanings in dictionaries and should be interpreted with meanings and concepts which are consistent with the technological scope of the invention based on the principle that the inventors can appropriately define concepts of terms in order to describe the invention in the best way.

In the present invention, a "grain" refers to a particle unit having the same crystallographic orientation, which is the smallest particle unit recognized as a single mass in an electron backscatter diffraction (EBSD) map image. The size of the grain may be measured by analyzing the EBSD map image.

In the present disclosure, "single particle" is a particle consisting of a single nodule and a "pseudo-single particle" is a particle which is a composite formed of 30 or less nodules.

A "nodule" according to the present disclosure refers to sub-particle unit constituting single particle and/or pseudo-single particle, may be a single crystal lacking any crystalline grain boundary, or alternatively may be a polycrystal in which grain boundaries do not appear when observed in a field of view of 5000× to 20000× using a scanning electron microscope (SEM). In the present disclosure, a "secondary particle" refers to a particle formed by agglomeration of a plurality several tens to several hundreds of primary particles. More specifically, a secondary particle is an agglomerate of 50 primary particles or more.

In the present disclosure, when a "particle" is described, any one or all of a single particle, a pseudo-single crystal, a primary particle, a nodule, and a secondary particle may be encompassed.

In the present invention, the average particle diameter ($D_{mean}$) of nodules or primary particles refers to an arithmetic average value calculated after measuring the particle diameter of nodules or primary particles observed in an SEM image.

In the present invention, an "average particle diameter ($D_{50}$)" refers to a particle size corresponding to a cumulative volume of 50% in the particle size distribution of a positive electrode material powder and may be measured by a laser diffraction method. For example, the average particle diameter ($D_{50}$) may be measured by dispersing a positive electrode material powder in a dispersion medium, performing irradiation with ultrasonic waves at a frequency of about 28 kHz and an output of 60 W using a commercially available laser diffraction particle size analyzer (e.g., Microtrac MT 3000), obtaining a volume-cumulative particle size distribution graph, and determining a particle size corresponding to a cumulative volume of 50%.

As a result of prolonged research to develop a positive electrode material for a lithium secondary battery which exhibits excellent high-temperature characteristics and excellent resistance characteristics, the inventors of the present invention have found that, when the average particle size ($D_{50}$) and grain size of a positive electrode material powder satisfy a specific relationship, an increase in resistance can be minimized, and excellent high-temperature characteristics can also be implemented, and thereby completed the present invention.

Specifically, a positive electrode material powder according to the present invention satisfies a degree of single-particle formation, represented by the following Equation (1), of 0.3 to 0.8.

$$\text{Degree of single-particle formation} = \frac{\sum_{i=1}^{n} \frac{4\pi}{3} R_i^3}{n} \times \frac{1}{D_{50}}. \qquad \text{Equation (1)}$$

In Equation (1), $R_i$ is a radius of the $i^{th}$ grain as measured by subjecting an electrode manufactured using the positive electrode material powder to ion milling and then analyzing the cross section of the electrode by EBSD, and the unit thereof is micrometer (m). Specifically, $R_i$ refers to ½ of the grain diameter calculated through image analysis of an EBSD map, and the grain diameter refers to a diameter of a circle having the same area as each grain and may be obtained using the software of an EBSD device.

n is the total number of grains as measured by the EBSD analysis and ranges from 350 to 450, preferably 380 to 430, and more preferably 390 to 410. When the total number of grains measured is excessively small, the tendency of a grain size in the entire positive electrode material powder may not be determined, and when the total number of grains measured is excessively large, measurement accuracy may be decreased.

The EBSD analysis is a method of measuring a crystallographic phase and a crystallographic orientation using the diffraction pattern of a sample and analyzing the crystallographic information of the sample based on the measured results. When a sample is tilted to have a large angle with respect to the incidence direction of an electron beam in an SEM, the incident electron beam is scattered in the sample, and a diffraction pattern appears in a sample surface direction. This pattern is referred to as an electron backscatter diffraction pattern (EBSP). Since the EBSP corresponds to the crystallographic orientation of the region irradiated with the electron beam, the crystallographic orientation of the sample may be accurately measured using the EBSP, and an EBSD inverse pole figure map (IPF map) showing the partition according to a grain having the same crystallographic orientation may be obtained. Also, information on a grain size, shape, orientation, and the like may be obtained by image analysis of the IPF map using the EBSD software.

In the present invention, for EBSD analysis of a positive electrode material powder, an electrode for EBSD analysis is manufactured using a positive electrode material powder to be analyzed, the manufactured electrode is cut through ion milling, and the cross section of the cut electrode is irradiated with an electron beam to perform EBSD analysis. Specifically, the electrode for EBSD analysis may be manufactured by mixing a positive electrode material powder to be analyzed, a conductive material, and a binder in N-methyl pyrrolidone to prepare an electrode slurry, applying the electrode slurry onto an aluminum current collector, and then drying the same. Meanwhile, a rolling process is not performed in the manufacture of the electrode for EBSD analysis. This is because positive electrode active material particles may be deformed and broken when a rolling process is performed.

Figure 2:
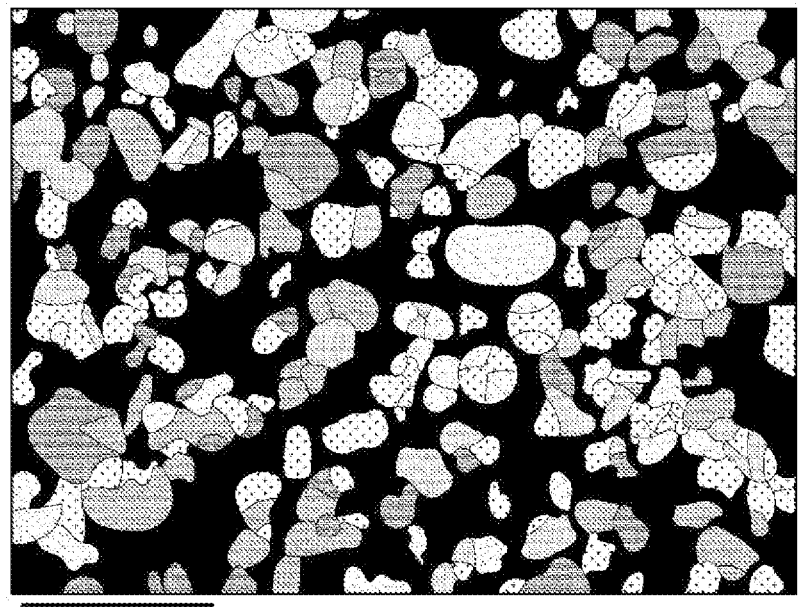
FIG. 2 shows an electron backscatter diffraction (EBSD) analysis image of the cross section of an electrode manufactured using a positive electrode material powder prepared in Example 1.
Figure 3:
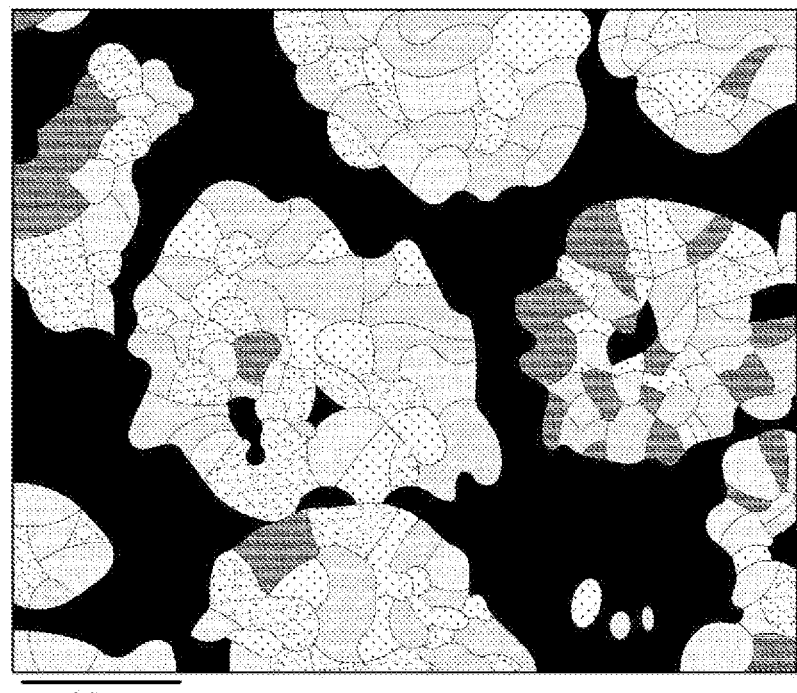
FIG. 3 shows an EBSD analysis image of the cross section of an electrode manufactured using a positive electrode material powder prepared in Comparative Example 1.
Figure 4:
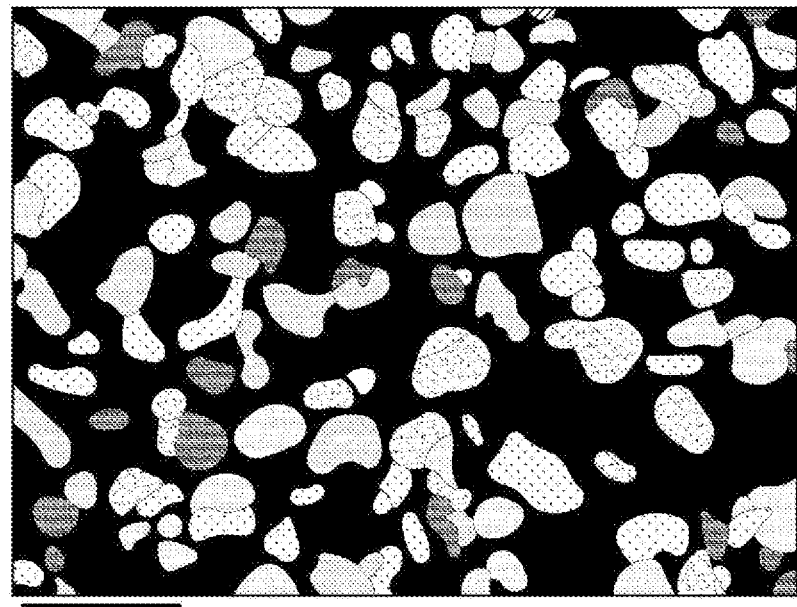
FIG. 4 shows an EBSD analysis image of the cross section of an electrode manufactured using a positive electrode material powder prepared in Comparative Example 2.

FIG. 2 to FIG. 4 show IPF map images obtained by cutting electrodes manufactured using positive electrode material powders prepared in Example 1, Comparative Example 1, and Comparative Example 2 (to be described below) through ion milling and then analyzing the cross section thereof by EBSD. As shown in FIG. 2 to FIG. 4, images partitioned according to a grain unit are obtained through EBSD analysis.

Meanwhile, $D_{50}$ is an average particle size of the positive electrode material powder as measured using a laser diffraction particle size analyzer, specifically, a particle diameter corresponding to a cumulative volume of 50% in a volume-cumulative particle size distribution graph as measured using a laser diffraction particle size analyzer.

In Equation (1), the total volume of spheres whose diameter is the same as the diameter of each grain measured through EBSD analysis is divided by the number of grains and then the resulting value is divided by the average particle diameter ($D_{50}$) of the positive electrode material powder. A case in which a degree of single-particle formation represented by Equation (1) is closer to 1 indicates that there are many positive electrode active material particles including a small number of grains in the positive electrode material powder—that is, many particles in the form of a single particle—and a case in which a degree of single-particle formation is closer to 0 indicates that there are many positive electrode active material particles including a large amount of grains, that is, many particles in the form of a secondary particle.

Meanwhile, the $D_{50}$ and grain radius substituted into Equation (1) are values measured on a micrometer (m) scale, but they are dimensionless numbers that do not have units.

According to research conducted by the inventors of the present technology, when the degree of single-particle formation represented by Equation (1) satisfies a specific range, high-temperature storage characteristics, high-temperature lifetime characteristics, and resistance characteristics can be improved at the same time.

Specifically, when a secondary battery is fabricated using a positive electrode material powder satisfying a degree of single-particle formation, represented by Equation (1), of 0.3 to 0.8, preferably, 0.3 to 0.6, as compared to a case using a conventional positive electrode material in the form of a secondary particle, a gas generation amount after high-temperature storage is substantially reduced, high-temperature lifetime characteristics are substantially improved, and an equivalent level of resistance characteristics is also maintained, and thus all of high-temperature storage characteristics, high-temperature lifetime characteristics, and resistance characteristics can be excellent. When a positive electrode material powder having a degree of single-particle formation of less than 0.3 is used, there is no improvement in gas generation and lifetime characteristics in high-temperature storage, and when a positive electrode material powder having a degree of single-particle formation of more than 0.8 is used, high-temperature lifetime characteristics and high-temperature storage characteristics are improved, but resistance is increased, and thus output and capacity characteristics are degraded.

Meanwhile, the positive electrode material powder according to the present invention includes positive electrode active material particles including a lithium nickel-based oxide represented by the following Chemical Formula 1:

$$\text{Li}_a\text{Ni}_b\text{Co}_c\text{M}^1_d\text{M}^2_e\text{O}_2 \qquad \text{[Chemical Formula 1]}$$

In Chemical Formula 1, $M^1$ may be Mn, Al, or a combination thereof, preferably, Mn or a combination of Mn and Al.

$M^2$ may be one or more selected from the group consisting of Ba, Ca, Zr, Ti, Mg, Ta, Nb, and Mo, preferably one or more selected from the group consisting of Zr, Y, Mg, and Ti, and more preferably Zr, Y, or a combination thereof. Although the $M^2$ element is not necessarily included, when an appropriate amount of the $M^2$ element is included, it may serve to promote grain growth during firing or enhance the stability of a crystal structure.

a represents a mole fraction of lithium in the lithium nickel-based oxide and may satisfy $0.80 \leq a \leq 1.20$, $0.90 \leq a \leq 1.10$, or $0.95 \leq a \leq 1.15$. When the mole fraction of lithium satisfies the above-described range, a stable layered crystal structure can be formed.

b represents a mole fraction of nickel among all metals excluding lithium in the lithium nickel-based oxide and may satisfy $0.55 \leq b < 1$, $0.60 \leq b < 1$, $0.80 \leq b < 1$, or $0.82 \leq b < 1$. When the mole fraction of nickel satisfies the above-described range, excellent capacity characteristics can be exhibited, and particularly, when the mole fraction of nickel is 0.80 or more, remarkably excellent capacity characteristics can be realized.

c represents a mole fraction of cobalt among all metals excluding lithium in the lithium nickel-based oxide and may satisfy $0 < c < 0.45$, $0 < c < 0.40$, $0 < c < 0.20$, or $0 < c < 0.18$.

d represents a mole fraction of the $M^1$ element among all metals excluding lithium in the lithium nickel-based oxide and may satisfy $0 < d < 0.45$, $0 < d < 0.40$, $0 < d < 0.20$, or $0 < d < 0.18$.

e represents a mole fraction of the $M^2$ element among all metals excluding lithium in the lithium nickel-based oxide and may satisfy $0 \leq e \leq 0.20$, $0 \leq e \leq 0.15$, or $0 \leq e \leq 0.10$.

More preferably, the lithium nickel-based oxide may be represented by the following Chemical Formula 1-1:

$$Li_{a1}Ni_{b1}Co_{c1}Mn_{d1}Al_{d2}M^2{}_{e1}O_2 \qquad \text{[Chemical Formula 1-1]}$$

In Chemical Formula 1-1, $M^2$ is one or more selected from the group consisting of Ba, Ca, Zr, Ti, Mg, Ta, Nb, and Mo, and $0.80 \leq a1 \leq 1.20$, $0.82 \leq b1 < 1$, $0 < c1 < 0.18$, $0 < d1 < 0.18$, $0 \leq d2 < 0.18$, and $0 \leq e1 \leq 0.20$, preferably, $0.80 \leq a1 \leq 1.20$, $0.82 \leq b1 < 1$, $0 < c1 < 0.15$, $0 < d1 < 0.15$, $0 < d2 < 0.15$, and $0 \leq e1 \leq 0.10$ may be satisfied. When the lithium nickel-based oxide has the composition represented by Chemical Formula 1-1, the structural stability and capacity characteristics of the positive electrode active material can be excellent.

Meanwhile, the positive electrode active material may further include a coating layer formed on the surface of the lithium nickel-based oxide and including one or more coating elements selected from the group consisting of Al, Ti, W, B, F, P, Mg, Ni, Co, Fe, Cr, V, Cu, Ca, Zn, Zr, Nb, Mo, Sr, Sb, Bi, Si, and S.

When the coating layer is present on the surface of the lithium nickel-based oxide, contact between an electrolyte and the lithium nickel-based oxide is suppressed by the coating layer, and accordingly, the elution of a transition metal or gas generation, which is caused by a side reaction with an electrolyte, can be reduced.

Preferably, the coating element may include Co. When a coating layer including Co is formed on the particle surface of the lithium nickel-based oxide, a side reaction with an electrolyte can be suppressed, output characteristics can be improved, and resistance can be decreased.

Meanwhile, the positive electrode active material particle of the present invention may comprise, or be in the form of, a single particle consisting of one nodule and/or a pseudo-single particle which is a composite of 30 or less nodules, preferably 2 to 20 nodules, and more preferably 2 to 10 nodules. Preferably, the positive electrode material powder according to the present invention may consist of a combination of positive electrode active material particles in the form of a single particle and a pseudo-single particle. When the number of nodules constituting the positive electrode active material particles exceeds 30, the breakage of particles is increased in manufacture of an electrode, and internal cracks are generated due to the volume expansion/contraction of nodules during charging and discharging, and thus high-temperature lifetime characteristics and high-temperature storage characteristics may be degraded.

Meanwhile, the positive electrode material powder according to the present invention may have an average grain diameter of 0.5 μm to 4 μm, preferably 0.8 μm to 2 μm, and more preferably 0.8 μm to 1.8 μm as measured by EBSD. When the average grain diameter of the positive electrode material powder satisfies the above-described range, a small amount of a halite phase is present in lithium nickel-based oxide, and thus remarkably excellent resistance characteristics can be exhibited.

Meanwhile, the positive electrode material powder may have a $D_{50}$ of 2.0 μm to 10.0 μm, preferably 2.0 μm to 8.0 μm, and more preferably 3.0 μm to 7.0 μm. When the $D_{50}$ of the positive electrode material powder is excessively small, processability is degraded in the manufacture of an electrode, and an electrolyte impregnation ability is degraded, and thus electrochemical properties may be increased, and when the $D_{50}$ thereof is excessively large, resistance may be increased, and output characteristics may be degraded.

The nodules of the positive electrode material powder may have an average particle diameter of 0.8 μm to 4.0 μm, preferably 0.8 μm to 3 μm, and more preferably 1.0 μm to 3.0 μm. When the average particle diameter of nodules satisfies the above-described range, the breakage of particles can be minimized in the manufacture of an electrode, and an increase in resistance can be more effectively suppressed. In this case, the average particle diameter of nodules refers to an arithmetic average value calculated after measuring the particle diameter of nodules observed in an SEM image obtained by analyzing the positive electrode material powder using an SEM.

The positive electrode material powder according to the present invention may be prepared by mixing a positive electrode active material precursor and a lithium raw material and firing the resulting mixture.

In this case, as the positive electrode active material precursor, a commercially available positive electrode active material precursor may be purchased and used, or the positive electrode active material precursor may be prepared by a precursor preparation method known in the art.

For example, the precursor may be prepared by inputting an aqueous transition metal solution, an ammonium cation-containing complex-forming agent, and a basic compound into a reactor and performing co-precipitation while stirring.

The aqueous transition metal solution may be prepared by dissolving a transition metal-containing raw material in a solvent such as water, for example, by dissolving a nickel-containing raw material, a cobalt-containing raw material, and a manganese-containing raw material in water. Also, as necessary, the aqueous transition metal solution may further include an aluminum-containing raw material.

Meanwhile, the transition metal-containing raw material may be an acetate, carbonate, nitrate, sulfate, halide, sulfide, or oxide of a transition metal.

Specifically, the nickel-containing raw material may be, for example, $NiO$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a nickel halide, or a combination thereof.

The cobalt-containing raw material may be, for example, $CoSO_4$, $Co(OCOCH_3)_2 \cdot 4H_2O$, $Co(NO_3)_2 \cdot 6H_2O$, $CoSO_4 \cdot 7H_2O$, or a combination thereof.

The manganese-containing raw material may be, for example, $Mn_2O_3$, $MnO_2$, $Mn_3O_4$, $MnCO_3$, $Mn(NO_3)_2$, $MnSO_4 \cdot H_2O$, manganese acetate, a manganese halide, or a combination thereof.

The aluminum-containing raw material may be, for example, $Al_2O_3$, $Al(OH)_3$, $Al(NO_3)_3$, $Al_2(SO_4)_3$, $(HO)_2AlCH_3CO_2$, $HOAl(CH_3CO_2)_2$, $Al(CH_3CO_2)_3$, an aluminum halide, or a combination thereof. However, in the case of Al, the addition along with a lithium raw material in a firing process to be described below is possible rather than the addition to the aqueous transition metal solution.

In this case, the addition amount of the individual transition metal-containing raw materials may be determined in consideration of a molar ratio of transition metals in a positive electrode material to be finally prepared. For example, in the present invention, they may be added in an amount such that a mole proportion of cobalt relative to manganese among all transition metals included in the aqueous transition metal solution is 0.5 or more and less than 1.

Meanwhile, the ammonium cation-containing complex-forming agent may include at least one compound selected from the group consisting of $NH_4OH$, $(NH_4)_2SO_4$, $NH_4NO_3$, $NH_4Cl$, $CH_3COONH_4$, and $NH_4CO_3$, and the compound may be added in the form of a solution in which the compound is dissolved in a solvent to a reactor. In this case, as the solvent, water or a mixture of water and an organic solvent (e.g., alcohol, etc.) uniformly mixable with water may be used.

The basic compound may be at least one compound selected from the group consisting of NaOH, KOH, and $Ca(OH)_2$, and the compound may be added in the form of a solution in which the compound is dissolved in a solvent to a reactor. In this case, as the solvent, water or a mixture of water and an organic solvent (e.g., alcohol, etc.) uniformly mixable with water may be used.

As described above, when the aqueous transition metal solution, the ammonium cation-containing complex-forming agent, and the basic compound are input into a reactor and stirred, transition metals in the aqueous transition metal solution are co-precipitated to form precursor particles in the form of a transition metal hydroxide.

In this case, the aqueous transition metal solution, the ammonium cation-containing complex-forming agent, and the basic compound are input in amounts such that the pH of a reaction solution falls within a desired range.

When precursor particles are formed by the above method, a positive electrode active material precursor is obtained by separation from a reaction solution. For example, a positive electrode active material precursor may be obtained by filtering a reaction solution to separate a positive electrode active material precursor from the reaction solution and then washing and drying the separated positive electrode active material precursor. In this case, as necessary, pulverization and/or classification processes may be performed.

Next, the positive electrode active material precursor and a lithium raw material are mixed and then fired to prepare a lithium nickel-based oxide. In this case, as necessary, an aluminum-containing raw material and/or a $M^1$ metal-containing raw material may also be added and fired.

As the lithium raw material, a lithium-containing sulfate, nitrate, acetate, carbonate, oxalate, citrate, halide, hydroxide, or oxyhydroxide may be used. For example, $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, $Li_3C_6H_5O_7$, or a mixture thereof may be used.

Meanwhile, the lithium raw material and the positive electrode active material precursor may be mixed so that a molar ratio of Li:total metals in the precursor is 1:1 to 1.2:1, preferably, 1:1 to 1.1:1. When a mixing ratio of the lithium raw material and metals in the positive electrode active material precursor satisfies the above-described range, the layered crystal structure of a positive electrode active material is stably formed, and thus a positive electrode material whose capacity characteristics and structural stability are excellent can be prepared.

Meanwhile, the firing is performed under the condition of growing grains of a positive electrode active material so that a degree of single-particle formation satisfies the range of the present technology. The formation of the active material powder in the form of a single particle and/or a pseudo-single particle, having the desired degree of single-particle formation, is influenced by the conditions of the firing, which in turn depend upon the characteristics of the positive electrode active material precursor, such as the composition and molar ratio of elements in the precursor, and the presence of any additives. For example, if the appropriate firing temperature is not selected to correspond to the composition of the precursor, the resulting active material powder may not be in the form of a single particle and/or a pseudo-single crystal, and may not satisfy the desired degree of single-particle formation.

In particular appropriate firing temperature for producing the necessary degree of single-particle formation may vary depending on a metal composition in the precursor. For example, when a nickel (Ni) content is 80 mol % or more, a firing temperature may be 790° C. to 950° C., preferably, 800° C. to 900° C.

In addition, the firing may be performed under an oxygen atmosphere for 5 to 35 hours. In the present specification, an oxygen atmosphere encompasses an air atmosphere and refers to an atmosphere containing enough oxygen to perform firing. In particular, the firing is preferably performed under an atmosphere in which an oxygen partial pressure is higher than an air partial pressure.

Meanwhile, in order to prepare a positive electrode active material on which a coating layer is formed, after the firing, mixing the lithium composite transition metal oxide prepared by the firing and a coating source material and thermally treating the resulting mixture may be further performed. In this case, the mixing may be performed by solid-phase mixing or liquid-phase mixing, and the thermal treatment may be performed at an appropriate temperature according to a coating source material. For example, the thermal treatment for the coating process may be performed at a temperature ranging from 200° C. to 700° C. or 300° C. to 600° C., but the present invention is not limited thereto.

Meanwhile, it is preferable that a washing process is not performed after the firing in the preparation of the positive electrode material powder according to the present invention. Conventionally, it is common that a washing process is performed after firing to reduce an amount of lithium by-products in the preparation of a nickel-rich NCM-based lithium nickel-based oxide having a nickel (Ni) content of 80 mol % or more. However, according to research conducted by the inventors of the present invention, when a washing process is performed in the preparation of a lithium nickel-based oxide in the form of a single particle or a pseudo-single particle, the surface characteristics of the lithium nickel-based oxide are degraded in the washing process, and thus resistance is increased. Therefore, it is preferable to consume lithium remaining on the surface of the lithium nickel-based oxide through formation of a coating layer without performing a washing process in the preparation of the positive electrode material according to the present invention. As described above, when a positive electrode material is prepared without performing washing the lithium nickel-based oxide, an increase in resistance caused by surface defects can be suppressed.

Positive Electrode

Next, a positive electrode according to the present invention will be described.

A positive electrode according to the present invention includes a positive electrode active material layer including the positive electrode material powder according to the present invention. Specifically, the positive electrode includes a positive electrode current collector and a positive electrode active material layer formed on the positive electrode current collector and including the positive electrode material powder. Since the positive electrode material powder has been described above, the detailed description thereof will be omitted, and only the components other than the positive electrode material powder will be described.

In the positive electrode, the positive electrode current collector is not particularly limited as long as it does not cause a chemical change in a battery and has conductivity. For example, stainless steel, aluminum, nickel, titanium, calcined carbon, aluminum or stainless steel whose surface has been treated with carbon, nickel, titanium, silver, or the like may be used. Also, the positive electrode current collector may typically have a thickness of 3 to 500 μm and have fine irregularities formed on the surface thereof to increase the adhesion of the positive electrode active material. For example, the positive electrode current collector may be used in any of various forms such as a film, a sheet, a foil, a net, a porous material, a foam, a non-woven fabric, and the like.

In addition, the positive electrode active material layer may include a conductive material and a binder in addition to the above-described positive electrode material powder.

The conductive material is used to impart conductivity to the electrode, and any conductive material that does not cause a chemical change in a battery and has conductivity may be used without particular limitation. Specific examples thereof include graphite such as natural graphite and artificial graphite; carbon-based materials such as carbon black, acetylene black, Ketjen black, channel black, furnace black, lamp black, thermal black, carbon fiber, carbon nanotubes, and the like; powders or fibers of metals such as copper, nickel, aluminum, silver, and the like; conductive whiskers such as zinc oxide, potassium titanate, and the like; conductive metal oxides such as titanium oxide and the like; and conductive polymers such as polyphenylene derivatives and the like, which may be used alone or in combination of two or more thereof. The conductive material may be typically included in an amount of 1 to 30 wt %, preferably 1 to 20 wt %, and more preferably 1 to 10 wt % with respect to the total weight of the positive electrode active material layer.

The binder serves to enhance the cohesion between positive electrode active material particles and the adhesion between the positive electrode active material and the positive electrode current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropyl cellulose, regenerated cellulose, polyvinylpyrrolidone, polytetrafluoroethylene, polyethylene, polypropylene, ethylene-propylene-diene monomer rubber (EPDM rubber), a sulfonated EPDM, styrene butadiene rubber (SBR), fluoro-rubber, and various copolymers thereof, which may be used alone or in combination of two or more thereof. The binder may be included in an amount of 1 to 30 wt %, preferably 1 to 20 wt %, and more preferably 1 to 10 wt % with respect to the total weight of the positive electrode active material layer.

The positive electrode may be manufactured by a typical method of manufacturing a positive electrode. For example, the positive electrode may be manufactured by mixing a positive electrode material, a binder, and/or a conductive material in a solvent to prepare a positive electrode slurry, applying the positive electrode slurry onto a positive electrode current collector, and drying and roll-pressing the same.

The solvent may be a solvent generally used in the art, and examples thereof include dimethyl sulfoxide (DMSO), isopropyl alcohol, N-methyl pyrrolidone (NMP), acetone, water, and the like, which may be used alone or in combination of two or more thereof. The usage amount of the solvent is sufficient as long as it is able to dissolve or disperse the positive electrode active material, conductive material, and binder considering the thickness of an applied slurry and manufacturing yield and allows a viscosity capable of exhibiting excellent thickness uniformity when applied to manufacture a positive electrode.

As another method, the positive electrode may be manufactured by laminating, on a positive electrode current collector, a film obtained by casting the positive electrode slurry on a separate support and removing it from the support.

Lithium Secondary Battery

Next, a lithium secondary battery according to the present invention will be described.

A lithium secondary battery according to the present invention includes the positive electrode according to the present invention. Specifically, the lithium secondary battery includes a positive electrode, a negative electrode disposed to face the positive electrode, a separator interposed between the positive electrode and the negative electrode, and an electrolyte, and the positive electrode has been described above. Also, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer positioned on the negative electrode current collector.

The negative electrode current collector is not particularly limited as long as it does not cause a chemical change in a battery and has high conductivity. For example, copper, stainless steel, aluminum, nickel, titanium, calcined carbon, copper or stainless steel whose surface has been treated with carbon, nickel, titanium, silver, or the like, an aluminum-cadmium alloy, or the like may be used. Also, the negative electrode current collector may typically have a thickness of 3 to 500 μm. Also, like the positive electrode current collector, the negative electrode current collector may have fine irregularities formed on the surface thereof to increase the adhesion of a negative electrode active material. For example, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material.

As the negative electrode active material, a compound that enables the reversible intercalation and deintercalation of lithium may be used. Specific examples thereof include: carbonaceous materials such as artificial graphite, natural graphite, graphitized carbon fiber, amorphous carbon, and the like; metallic compounds capable of alloying with lithium, such as Si, Al, Sn, Pb, Zn, Bi, In, Mg, Ga, Cd, a Si alloy, a Sn alloy, an Al alloy, and the like; metal oxides capable of doping and dedoping lithium, such as $SiO_\beta$ ($0<\beta<2$), $SnO_2$, vanadium oxide, and lithium vanadium oxide; and composites including the metallic compound and the carbonaceous material, such as a Si—C composite and a Sn—C composite, which may be used alone or in combination of two or more thereof.

In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes, and the like.

The conductive material is used to impart conductivity to the electrode, and any conductive material that does not cause a chemical change in a battery and has conductivity may be used without particular limitation. Specific examples thereof include graphite such as natural graphite and artificial graphite; carbon-based materials such as carbon black, acetylene black, Ketjen black, channel black, furnace black, lamp black, thermal black, carbon fiber, carbon nanotubes, and the like; powders or fibers of metals such as copper, nickel, aluminum, silver, and the like; conductive whiskers such as zinc oxide, potassium titanate, and the like; conductive metal oxides such as titanium oxide and the like; and conductive polymers such as a polyphenylene derivative and the like, which may be used alone or in combination of two or more thereof. The conductive material may be typically included in an amount of 1 to 30 wt %, preferably 1 to 20 wt %, and more preferably 1 to 10 wt % with respect to the total weight of the negative electrode active material layer.

The binder serves to improve the cohesion between negative electrode active material particles and the adhesion between the negative electrode active material and the negative electrode current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), a sulfonated EPDM, styrene butadiene rubber (SBR), fluororubber, and various copolymers thereof, which may be used alone or in combination of two or more thereof. The binder may be included in an amount of 1 to 30 wt %, preferably 1 to 20 wt %, and more preferably 1 to 10 wt % with respect to the total weight of the negative electrode active material layer.

The negative electrode active material layer may be formed, for example, by applying, onto a negative electrode current collector, a negative electrode slurry including a negative electrode active material and, optionally, a binder, and a conductive material and drying the same, or by laminating, on a negative electrode current collector, a film obtained by casting the negative electrode slurry on a separate support and removing it from the support.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present invention, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the fabrication of a lithium secondary battery, may be used, but the present invention is not limited thereto.

Specifically, the electrolyte may include an organic solvent and a lithium salt.

As the organic solvent, any solvent that may function as a medium through which ions involved in an electrochemical reaction of a battery can migrate may be used without particular limitation. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred.

As the lithium salt, any compound that may provide lithium ions used in a lithium secondary battery may be used without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The lithium salt is preferably used at a concentration ranging from 0.1 to 5.0 M, preferably, 0.1 to 3.0 M. When the concentration of the lithium salt falls within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include an additive for the purpose of improving the lifetime characteristics of the battery, suppressing a reduction in battery capacity, enhancing the discharge capacity of the battery, or the like. Examples of the additive include a haloalkylene carbonate-based compound such as difluoroethylene carbonate and the like, pyridine, triethylphosphite, triethanolamine, cyclic ether, ethylenediamine, n-glyme, hexamethylphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like, which may be used alone or in combination thereof, but the present invention is not limited thereto. In this case, the additive may be included in an amount of 0.1 to 10 wt %, preferably, 0.1 to 5 wt % with respect to the total weight of the electrolyte.

Since the lithium secondary battery including the positive electrode active material according to the present invention stably exhibits excellent discharge capacity, output characteristics, and capacity retention rate as described above, it is useful in the field of portable devices such as mobile phones, notebook computers, digital cameras, and the like and electric vehicles such as hybrid electric vehicles (HEVs) and the like.

Accordingly, according to still another embodiment of the present invention, a battery module including the lithium secondary battery as a unit cell and a battery pack including the battery module are provided.

The battery module or battery pack may be used as a power source for one or more medium-to-large-sized devices selected from power tools; electric vehicles (EVs), hybrid electric vehicles, and plug-in hybrid electric vehicles (PHEVs); and energy storage systems.

Hereinafter, the present invention will be described in detail with reference to examples so that those skilled in the art can easily carry out the present invention. However, the present invention may be embodied in several different forms, and therefore, is not limited to examples described herein.

Example 1

A nickel-cobalt-manganese hydroxide powder having a molar ratio of a Ni:Co:Mn of 83:11:6 and lithium hydroxide were mixed so that a molar ratio of transition metals (Ni+Co+Mn):Li became 1:1.05 and then fired at 870° C. for 10 hours to prepare a positive electrode material powder.

Example 2

A positive electrode material powder was prepared in the same manner as in Example 1, except that firing was performed at 890° C.

Example 3

A positive electrode material powder was prepared in the same manner as in Example 1, except that firing was performed at 910° C.

Example 4

A positive electrode material powder was prepared in the same manner as in Example 1, except that firing was performed at 930° C.

Comparative Example 1

A positive electrode material powder was prepared in the same manner as in Example 1, except that firing was performed at 770° C.

Comparative Example 2

A positive electrode material powder was prepared in the same manner as in Example 1, except that firing was performed at 950° C.

Experimental Example 1: Measurement of $D_{50}$ and Particle Diameter of Primary Particle 0.1 g of each positive electrode material powder prepared in Examples 1~4 and Comparative Examples 1~2 was dispersed in a dispersion medium, and the resultant was input into a laser diffraction particle size analyzer (Microtrac MT 3000) and irradiated with ultrasonic waves at a frequency of about 28 kHz and an output of 60 W, and the $D_{50}$ of each positive electrode material powder was measured. Measurement results are shown in Table 1 below.

In addition, an SEM image of each positive electrode material powder prepared in Examples 1~4 and Comparative Examples 1~2 was obtained using a scanning electron microscope. Then, the particle diameter of nodule/primary particles identified in the obtained SEM image was measured, and the arithmetic average value thereof was calculated to obtain the average particle diameter ($D_{mean}$) of nodules/primary particles of each positive electrode material powder. Measurement results are shown in Table 1 below.

FIG. 1 shows SEM images of the positive electrode material powders of Example 1 and Comparative Examples 1 and 2.

Experimental Example 2: Measurement of Grain Size and Degree of Single-Particle Formation Each positive electrode material powder prepared in Examples 1~4 and Comparative Examples 1~2, carbon black, and a PVDF binder were mixed in a weight ratio of 95:2:3 in N-methyl pyrrolidone to prepare an electrode slurry. The electrode slurry was applied onto one surface of an aluminum current collector and then dried at 130° C. to manufacture an electrode for EBSD analysis. In the manufacture of the positive electrode, rolling was not performed.

The positive electrode was cut using an ion milling device (HITACHI IM-500, accelerating voltage: 6 kV) to obtain a cross section, and the cross section of the positive electrode was subjected to EBSD analysis using a FE-SEM device (JEOL JSM7900F) equipped with an EBSD pattern analyzer. The EBSD analysis was performed under the condition of an accelerating voltage of 15 kV and a W.D. of 15 mm on a scale of about 400±10 grains. Through the EBSD analysis, the diameter of grains in the particle observed in the cross section of each positive electrode was measured, ½ of the measured maximum grain diameter was obtained as a radius of a grain, and an arithmetic average value of the measured grain diameter was obtained as an average grain diameter. Also, the radius of grain and $D_{50}$ measured in Experimental Example 1 were substituted into Equation (1) to calculate a degree of single-particle formation. Measurement results are shown in the following Table 1.

FIG. 2 to FIG. 4 show EBSD maps of the cross section of the electrodes manufactured using the positive electrode material powders of Example 1 and Comparative Example 1 and 2, respectively.

TABLE 1

| | $D_{50}$ [μm] | Average particle diameter of nodule/primary particles ($D_{mean}$) [μm] | Average grain diameter [μm] | Degree of single-particle formation |
|---|---|---|---|---|
| Example 1 | 3.63 | 1.80 | 1.10 | 0.413 |
| Example 2 | 3.63 | 1.90 | 1.20 | 0.500 |
| Example 3 | 3.57 | 2.10 | 1.30 | 0.600 |
| Example 4 | 3.63 | 2.20 | 1.40 | 0.750 |
| Comparative Example 1 | 4.84 | 0.41 | 0.36 | 0.0079 |
| Comparative Example 2 | 3.57 | 2.40 | 1.50 | 0.810 |

<Fabrication of Lithium Secondary Battery>

Each positive electrode material powder prepared in Examples 1~4 and Comparative Examples 1~2, a carbon black conductive material, and a PVDF binder were mixed in a weight ratio of 95:2:3 in N-methyl pyrrolidone to prepare a positive electrode slurry. The positive electrode slurry was applied onto one surface of an aluminum current collector, dried at 130° C., and roll-pressed to manufacture a positive electrode.

Graphite as a negative electrode active material, Super C as a conductive material, and SBR/CMC as a binder were mixed in a weight ratio of 95.6:1.0:3.4 to prepare a negative electrode slurry, and the slurry was applied onto one surface of a copper current collector, dried at 130° C., and roll-pressed to manufacture a negative electrode.

A separator was interposed between the positive electrode and the negative electrode to manufacture an electrode assembly, the electrode assembly was placed in a battery case, and an electrolyte was injected into the case to fabricate a lithium secondary battery. The electrolyte was prepared by dissolving $LiPF_6$ at a concentration of 1 M in an organic solvent obtained by mixing ethylene carbonate, dimethyl carbonate, diethyl carbonate in a volume ratio of 1:2:1 and adding 2 wt % of vinylene carbonate (VC).

Experimental Example 3: Evaluation of High-Temperature Storage Characteristics

Figure 5:
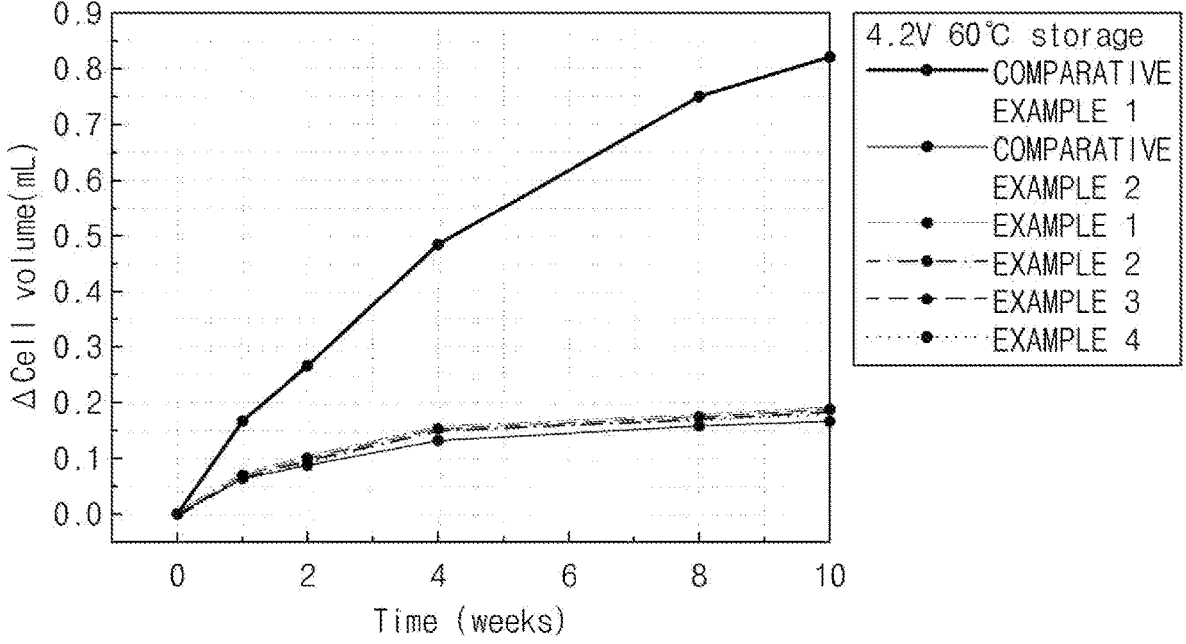
FIG. 5 is a graph showing the gas generation amount of batteries fabricated using positive electrode materials of Examples 1~4 and Comparative Examples 1~2 during high-temperature storage.

Each lithium secondary battery fabricated as described above was charged in the CC-CV mode of 1 C to 4.25 V, and then the secondary battery was disassembled to separate the positive electrode. Afterward, 400 mg of the positive electrode and 400 L of an electrolyte were placed in a pouch-type battery case, the case was sealed to fabricate a cell, and the cell was stored at 60° C. for 10 weeks. A cell volume variation (Δcell volume, units: ΔmL) before and after high-temperature storage was measured. The cell volume variation was measured by immersing the cell in water and measuring a water volume variation. Measurement results are shown in FIG. 5 and Table 2.

Experimental Example 4: Evaluation of High-Temperature Lifetime Characteristics

Figure 6:
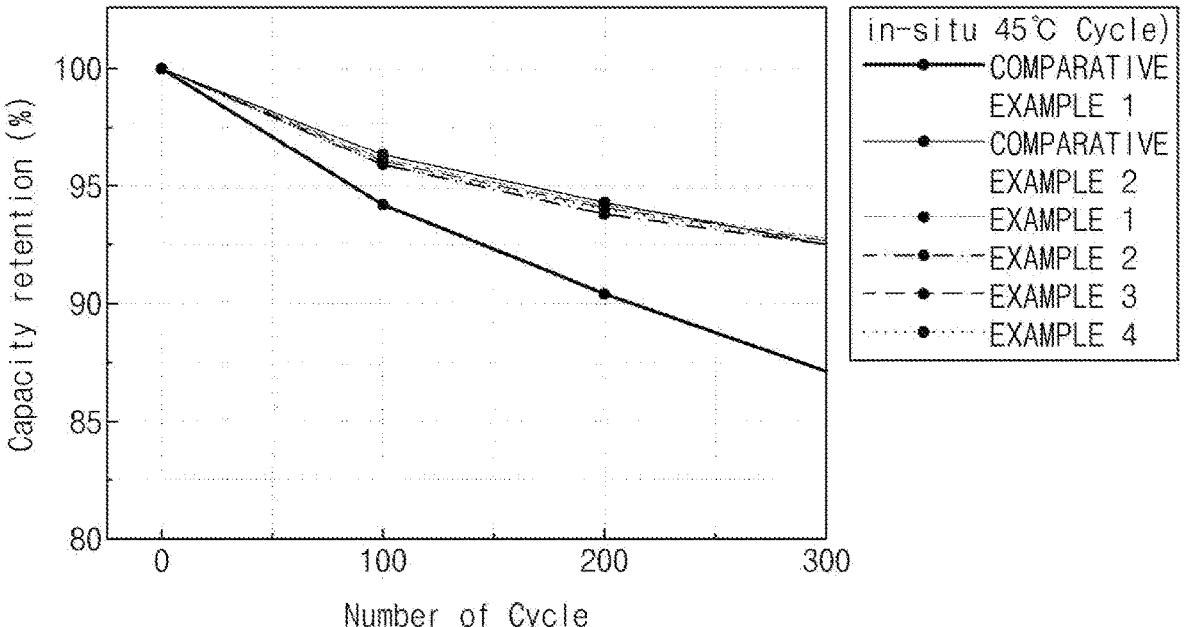
FIG. 6 is a graph showing the high-temperature lifetime characteristics of lithium secondary batteries fabricated using positive electrode materials of Examples 1-4 and Comparative Examples 1~2.

Each lithium secondary battery fabricated as described above was charged at 45° C. in the CC-CV mode of 1 C to 4.2 V and discharged at a constant current of 0.05 C to 2.5 V. This process was set as one cycle and repeated for 300 cycles, and then a capacity retention rate was measured to evaluate lifetime characteristics. Measurement results are shown in FIG. 6 and Table 2.

TABLE 2

| | Cell volume variation after 10-week high-temperature storage (ΔmL) | High-temperature lifetime characteristics (%) |
|---|---|---|
| Example 1 | 0.189 | 92.5 |
| Example 2 | 0.189 | 92.5 |
| Example 3 | 0.193 | 92.6 |
| Example 4 | 0.182 | 92.5 |
| Comparative Example 1 | 0.820 | 87.2 |
| Comparative Example 2 | 0.170 | 92.6 |

Experimental Example 5: Evaluation of Resistance Characteristics

Each positive electrode material powder prepared in Examples 1~4 and Comparative Examples 1~2, a carbon black conductive material, and a PVDF binder were mixed in a weight ratio of 95:2:3 in N-methyl pyrrolidone to prepare a positive electrode slurry. The positive electrode slurry was applied onto one surface of an aluminum current collector, dried at 130° C., and roll-pressed to manufacture a positive electrode.

As a negative electrode, a lithium metal electrode was used.

A separator was interposed between the positive electrode and the negative electrode to manufacture an electrode assembly, the electrode assembly was placed in a battery case, and an electrolyte was injected into the case to fabricate a coin half-cell. The electrolyte was prepared by dissolving $LiPF_6$ at a concentration of 1 M in an organic solvent obtained by mixing ethylene carbonate, dimethyl carbonate, and diethyl carbonate in a volume ratio of 1:2:1 and adding 2 wt % of VC.

The coin half-cell was subjected to one cycle of charging and discharging under the condition of 0.1 C/0.1 C to 2.5 to 4.25 V, then charged again to 4.25 V, and resistance (units: Ω) according to an SOC was measured while discharging 10% of the cell discharge capacity. In this case, the resistance was measured through the voltage change when a current density of 1.0 C was applied for 10 seconds at each SOC. Measurement results are shown in FIG. 7.

Figure 7:
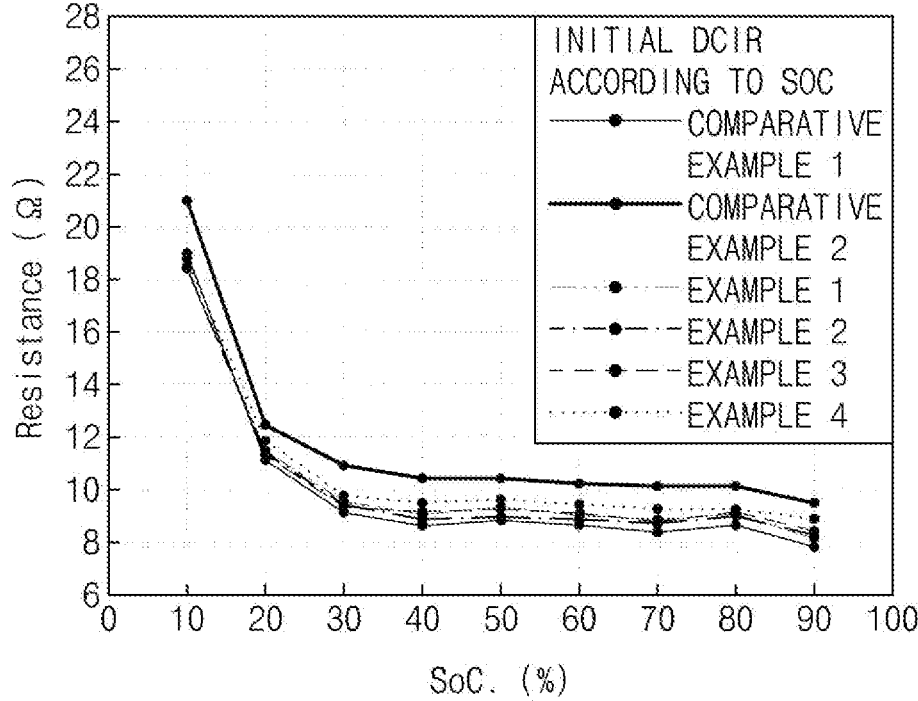
FIG. 7 is a graph showing the resistance characteristics of lithium secondary batteries fabricated using positive electrode materials of Examples 1~4 and Comparative Examples 1~2 according to a state of charge (SOC).

Referring to Table 2 and FIGS. 5 to 7, in the case of the battery using the positive electrode material powder of Examples 1~4, which had a degree of single-particle formation represented by Equation (1) within the range of the present invention, it can be confirmed that high-temperature lifetime characteristics and high-temperature storage characteristics were remarkably excellent compared to the battery using the positive electrode material powder of Comparative Example 1, and an equivalent level of resistance characteristics to those of the battery of Comparative Example 1 was exhibited, that is, there was almost no increase in resistance.

On the other hand, in the case of the battery using the positive electrode material powder of Comparative Example 2, it can be confirmed that equivalent levels of high-temperature lifetime characteristics and high-temperature storage characteristics to those of the battery using the positive electrode material powder of Example 1 were exhibited, but resistance was substantially increased.

The positive electrode material powder according to the present invention is characterized in that a degree of single-particle formation represented by Equation (1) satisfies a range of 0.3 to 0.8. A secondary battery using a positive electrode material powder having a degree of single-particle formation represented by Equation (1) of less than 0.3 exhibits a large gas generation amount and degraded high-temperature lifetime characteristics when stored at a high temperature, and a secondary battery using a positive electrode material powder having a degree of single-particle formation of more than 0.8 exhibits excellent high-temperature storage characteristics and excellent high-temperature lifetime characteristics, but output and capacity characteristics are degraded due to its high resistance. On the other hand, a secondary battery using a positive electrode material powder having a degree of single-particle formation within the range of the present invention is excellent in all of high-temperature lifetime characteristics, high-temperature storage characteristics, and resistance characteristics.

What is claimed is:

1. A positive electrode material powder comprising a lithium nickel-based oxide represented by the following Chemical Formula 1, and having a degree of single-particle formation, represented by the following Equation (1), of 0.3 to 0.8:

$$Li_aNi_bCo_cM^1_dM^2_eO_2 \qquad \text{[Chemical Formula 1]}$$

in Chemical Formula 1, $M^1$ is Mn, Al, or a combination thereof, $M^2$ is one or more selected from the group consisting of Ba, Ca, Zr, Ti, Mg, Ta, Nb, and Mo, and $0.80 \leq a \leq 1.20$, $0.55 \leq b < 1$, $0 < c < 0.45$, $0 < d < 0.45$, and $0 \leq e \leq 0.20$ are satisfied;

$$\text{Degree of single-particle formation} = \frac{\sum_{i=1}^{n} \frac{4\pi}{3} R_i^3}{n} \times \frac{1}{D_{50}} \qquad \text{Equation (1)}$$

in Equation (1), $R_i$ is a radius of an $i^{th}$ grain as measured by analyzing an electrode manufactured using the positive electrode material powder using electron backscatter diffraction (EBSD) after being subjected to ion milling, n is a total number of grains as measured by the EBSD analysis and ranges from 350 to 450, and $D_{50}$ is a volume-cumulative average particle diameter of the positive electrode material powder as measured using a particle size analyzer.

2. The positive electrode material powder of claim 1, wherein the positive electrode active material powder comprises at least one of a single particle consisting of one nodule and a pseudo-single particle which is a composite of 30 or less nodules.

3. The positive electrode material powder of claim 1, wherein the positive electrode material powder consists of a combination of positive electrode active material particles in the form of a single particle and in the form of a pseudo-single particle.

4. The positive electrode material powder of claim 1, wherein the positive electrode material powder has an average grain diameter of 0.5 μm to 4 μm.

5. The positive electrode material powder of claim 1, wherein the positive electrode material powder has a $D_{50}$ of 2.0 μm to 10.0 μm.

6. The positive electrode material powder of claim 1, wherein the nodules of the positive electrode material powder have an average particle diameter of 0.8 μm to 4.0 μm.

7. The positive electrode material powder of claim 1, wherein the positive electrode material powder has a degree of single-particle formation, represented by Equation (1), of 0.3 to 0.6.

8. The positive electrode material powder of claim 1, wherein, in the Chemical Formula 1, $0.80 \leq b < 1$, $0 < c < 0.20$, $0 < d < 0.20$, and $0 \leq e \leq 0.10$ are satisfied.

9. The positive electrode material powder of claim 1, wherein the lithium nickel-based oxide is represented by the following Chemical Formula 1-1:

$$Li_{a1}Ni_{b1}Co_{c1}Mn_{d1}Al_{d2}M^2_{e1}O_2 \qquad \text{[Chemical Formula 1-1]}$$

in Chemical Formula 1-1, $M^2$ is one or more selected from the group consisting of Ba, Ca, Zr, Ti, Mg, Ta, Nb, and Mo, and $0.80 \leq a1 \leq 1.20$, $0.82 \leq b1 < 1$, $0 < c1 < 0.18$, $0 < d1 < 0.18$, $0 \leq d2 < 0.18$, and $0 \leq e1 \leq 0.20$ are satisfied.

10. The positive electrode material powder of claim 1, wherein the positive electrode active material further includes a coating layer formed on the surface of the lithium nickel-based oxide and including one or more coating elements selected from the group consisting of Al, Ti, W, B, F, P, Mg, Ni, Co, Fe, Cr, V, Cu, Ca, Zn, Zr, Nb, Mo, Sr, Sb, Bi, Si, and S.

11. A positive electrode comprising the positive electrode material powder according to claim 1 and a current collector.

12. A lithium secondary battery comprising the positive electrode according to claim 11 and a negative electrode.

*    *    *    *    *